(12) United States Patent
Breihan et al.

(10) Patent No.: US 7,780,202 B2
(45) Date of Patent: Aug. 24, 2010

(54) OILFIELD TUBULAR CONNECTION WITH INCREASED COMPRESSION CAPACITY

(75) Inventors: James Breihan, Houston, TX (US); Andyle Gregory Bailey, Kingwood, TX (US); Matthew Hegler, Houston, TX (US)

(73) Assignee: Grant Prideco, LP, Houston, TX (US)

( * ) Notice: Subject to any disclaimer, the term of this patent is extended or adjusted under 35 U.S.C. 154(b) by 565 days.

(21) Appl. No.: 11/850,226

(22) Filed: Sep. 5, 2007

(65) Prior Publication Data

US 2009/0058085 A1  Mar. 5, 2009

(51) Int. Cl.
 *F16L 25/00* (2006.01)
(52) U.S. Cl. .................. 285/334; 285/333; 285/390
(58) Field of Classification Search ................. 285/333, 285/355, 390, 334
See application file for complete search history.

(56) References Cited

U.S. PATENT DOCUMENTS

| 4,537,406 | A | * | 8/1985 | Hirasuna et al. | ............ 277/314 |
| 7,007,984 | B2 | * | 3/2006 | Church | ........................ 285/333 |
| 7,066,209 | B2 | * | 6/2006 | Imai | ......................... 138/96 T |
| 7,585,002 | B2 | * | 9/2009 | Curley et al. | ................. 285/333 |
| 2004/0100098 | A1 | * | 5/2004 | Church | ........................ 285/333 |
| 2005/0236834 | A1 | * | 10/2005 | Curley et al. | ................. 285/333 |

* cited by examiner

*Primary Examiner*—Aaron Dunwoody

(57) ABSTRACT

A threaded oilfield tubular connection 10 includes a pin member 12 having a first external tapered thread 24 and a second external tapered thread 26. A box member includes a first internal tapered thread 14 and a second internal tapered thread 16. Helical torque shoulders 40, 42 are provided on the pin member and the box member, and an axially spaced between the respective first and second threads. The helix of each torque shoulder includes a plurality of revolutions with compression flanks on both the pin member and the box member.

27 Claims, 3 Drawing Sheets

OILFIELD TUBULAR CONNECTION WITH INCREASED COMPRESSION CAPACITY

BACKGROUND OF THE INVENTION

1. Field of the Invention

The present invention relates to oilfield tubular threaded connections and, more particularly, to a highly reliable connection with tapered threads and a torque shoulder. A threaded oilfield tubular connection is provided with features that result in increased compression and torsional capacity, and more particularly a tubular connection which limits the loss of preload.

2. Description of the Related Art

A common problem associated with oilfield tubular connections is the effect of compression on the connection and the resulting loss of preload. While many connections are able to withstand a high compression loading, a good portion of preload may be lost when the compressive force is lowered, resulting in leakage of the connection. A common oilfield connection includes a two-step axially spaced threads on different diameters, and an intermediate torque shoulder between the step threads.

Non-upset, integral connections, such as flush and semi-flush outer diameter connections, have the inherent limitation of the wall thickness of the pipe upon which they are machined. Flush connectors have the same outer diameter as the pipe. Semi-flush connectors are also referred to as expanded box connectors, since the pipe is expanded on the end upon which the female (box) connector is machined. Swaging and cold forming, unlike upsetting, may move the wall to a different position, but do not significantly affect the thickness. The connection designer is frequently faced with the need for balancing many features. This includes a seal or seals, robust thread form, and a place to store preload torque, most often in the form of a torque shoulder. Accommodating these features in a limited space while maintaining connection capacity is a challenge.

Several integral, two-step, negative load flank, tapered, dual seal connectors exist in the market. The GP ANJO includes a negative load flank thread form, two step, tapered thread pitch, 15 degree torque shoulder angle, internal seal, and an external seal at box face. The Hydril SLX has a negative load flank thread form, two step, tapered thread pitch, 15 degree torque shoulder angle, internal seal, and external seal mid-connector on a small step. The VAM SLIJII connection has a negative load flank thread form, two step, tapered thread pitch, vertical torque shoulder, internal seal, and external seal at box face. An integral, single-step, negative load flank, tapered, single seal connector is also marketed. The Hydril 523 connection has negative load flank dovetail thread form, negative stab flank dovetail thread form, single step, tapered thread pitch, torque shoulder achieved by simultaneous engagement of the load and stab flank, internal seal, and an external seal provided by thread compound and thread profile. These connectors are known as wedge threads due to their use of the stab flank as a stop shoulder.

Threads which have load and stab flank engagement in the final made up position already exist. These include API connectors including LTC and STC commonly referred to as eight-round. These are known as flank to flank threads. Grant Prideco's TC-II connector product line has load and stab flank engagement. These threads have largely been abandoned for use in integral connectors due to jump out. Jump out is the phenomena particular to more flexible connectors, such as the integral joints. When these connectors experience high tension loads, the threads disengage due to the radial reaction force on the load flank and come apart. Negative load flank forms resolve this problem.

A common thread form involves root to crest contact. This is common to most negative load flank threads as well as some API connectors including the buttress thread form. The absence of a negative load flank makes this form less desirous for integral joints. The negative load flank and the root to crest thread form, in absence of a wedge, is the most common thread form for high performance integral joints. The weakness of this thread form is in the stab flank clearance. This is necessary to prevent galling, but limits its capacity in compression, bending and torsion.

Finally, wedge threads use a different load and stab flank lead to enact both flank to flank and/or root to crest engagement during makeup while avoiding galling with either positive or negative flank angles. A weakness of this thread form is the lack of makeup repeatability as to its position and the effect on metal to metal seals. This may be compensated for with long, low taper seals that have lower variability in interference with higher variability in axial position. High compression, bending and torsional strength are attained through the helical compression flank engaged simultaneously with the load flank, along with the negative load flank angle to avoid jump out and the option for the negative stab flank for additional radial support.

The disadvantages of the prior art are overcome by the present invention, and an improved oilfield tubular connection which utilizes an improved torque shoulder to limit the effective compression on loss of preload is hereinafter disclosed.

BRIEF SUMMARY OF THE INVENTION

The connection incorporates a helical torque shoulder to limit the effect of compression on loss of preload. The connection may be used for tapered, two step connectors wherein the torque shoulder is mid-step and may incorporate a root to crest contact, negative load flank thread form. Connectors with limited material available for a torque shoulder, such as flush and semi-flush integral connectors, may significantly benefit from these features. A helical torque shoulder and engaged compression flank on the torque shoulder threads augments the axial bearing area with limited radial spacing. The axial length and bearing surfaces of the helical torque shoulder may be utilized to accomplish these objectives.

In one embodiment, an oilfield tubular threaded connection comprises a pin member having a first radially outer thread and a second radially outer thread axially spaced from the first radially inner thread. The connection includes a box member having a third radially inner thread and a fourth radially inner thread axially spaced from the third radially inner thread, the first thread mating with the third thread and the second thread mating with the fourth thread when the connection is assembled. A pin member helical torque shoulder is spaced between the first and second threads and is formed by a plurality of helical intermediate threads. The box member helical torque shoulder is similarly spaced between the third and the fourth threads and is formed by a plurality of helical threads. The pin member helical torque shoulder threads mate with the box member helical torque shoulder threads when the connection is assembled.

These and further features and advantages of the present invention will become apparent from the following detailed description, wherein reference is made to the figures in the accompanying drawings.

DETAILED DESCRIPTION OF THE INVENTION AND THE PREFERRED EMBODIMENT

Figure 1:
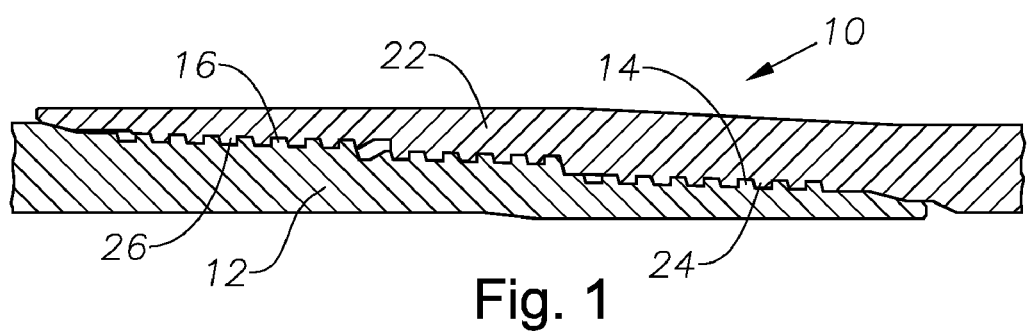
FIG. 1 is a cross-sectional view of a pin and box of an oilfield tubular connection.

FIG. 1 illustrates an oilfield tubular connection with a helical torque shoulder section between tapered threads of a two-step threaded connection. The third set of threads in the center, thus act as the helical torque shoulder. The threaded oilfield tubular connection 10 comprises a pin member 12 having a first external tapered thread 14 and a second external tapered thread 16 axially spaced from the first tapered thread. The connection also includes a box member 22 having a first internal tapered thread 24 for mating engagement with the first external tapered thread 14 and a second internal tapered thread 26 for mating engagement with the second external tapered thread 16. The connection includes a helical torque shoulder on each of the pin member and the box member and axially spaced between the respective first and second threads. Each helix of the helical torque shoulder includes a plurality of revolutions with compression flanks on both the pin and the box member engaged when the connection is assembled.

Figure 2:
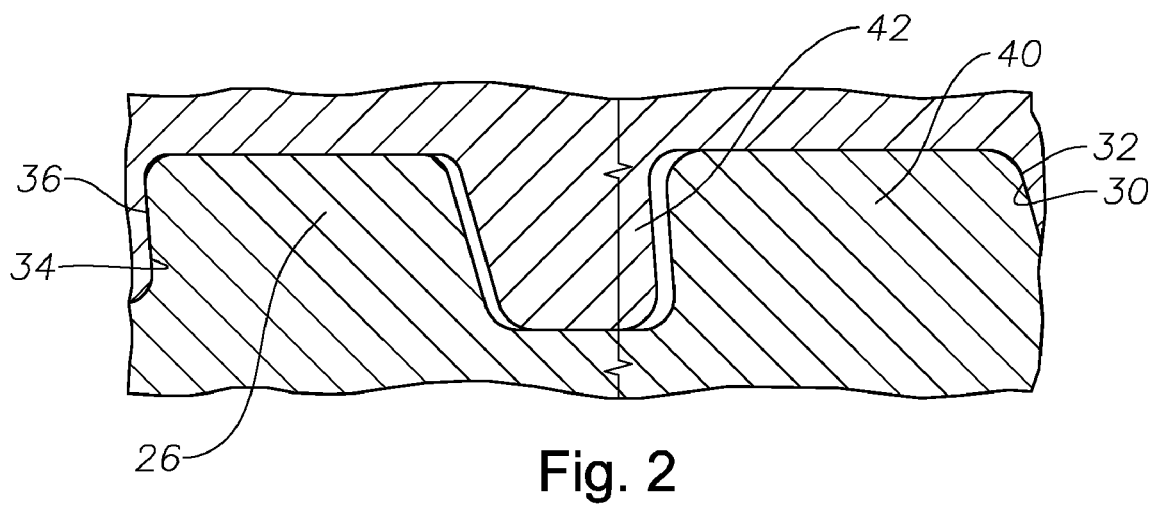
FIG. 2 illustrates in cross-section the clearances on the helical torque shoulder to the right and the threads to the left. Note stab flank clearance on the thread and load flank clearance on the helical torque shoulder.

As shown in greater detail in FIG. 2, stab or compression flanks 30, 32 on the intermediate set of threads are engaged while the tension flanks 34, 36 on the first and second sets of threads engage when the connection is made up. FIG. 2 thus shows one of the threads 40 of the helical torque shoulder on the pin member, and of another thread 42 of the helical torque shoulder on the box member. The helical torque shoulder on the pin member is a continuous shoulder along a plurality of revolutions for engaging a similar continuous shoulder on the box member. FIG. 2 illustrates the symmetry and profile of the three sets of threads, and the disparity in function. The center section, which is on the right in FIG. 2, forms a helical torque shoulder and is engaged on the stab or compression flank. The helical torque shoulder 40, 42 has thread grooves which lie along a tapered plane spaced radially outward of a plane of the pin member external threads spaced axially between the torque shoulder and the pin nose of the pin member. Each of the other two steps are engaged on the load or tension flank, as shown on the left in FIG. 2.

Figure 3:
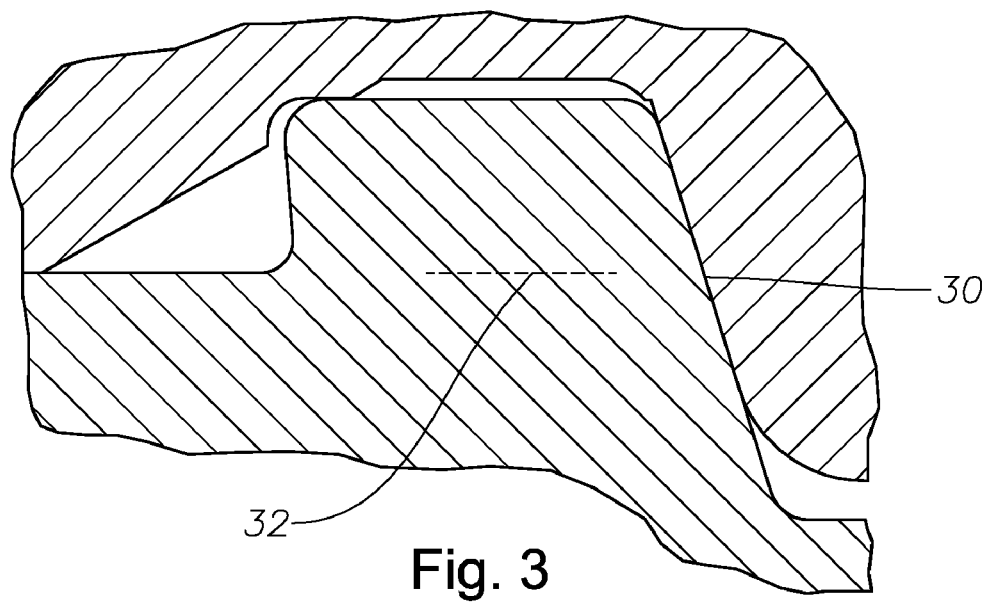
FIG. 3 shows the optional feature of a stop shoulder below the thread root plane of the helical torque shoulder center section.

FIG. 3 discloses an optional feature, wherein a stop shoulder region 30 below the thread root plane 32 is provided. The stab flanks may thus also be used as a stop shoulder. This alternative feature may be used to augment the helical surface area of the stab flank with the asymmetric feature of the stop shoulder. The connection may be made up to the same position repeatedly augmenting the sealing reliability of the metal-to-metal seals.

Figure 4:
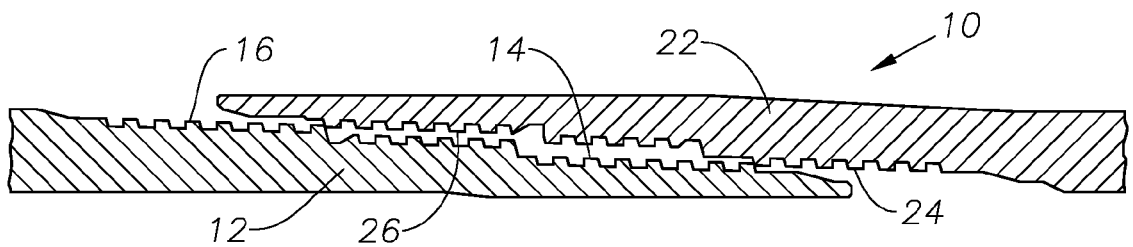
FIG. 4 illustrates initial engagement of the pin and box.
Figure 5:
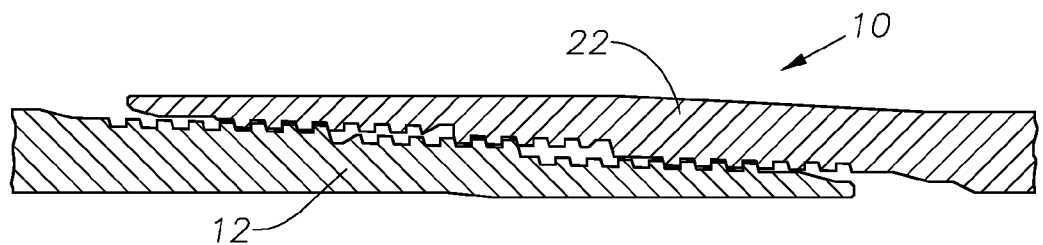
FIG. 5 illustrates further engagement of the pin and box.
Figure 6:
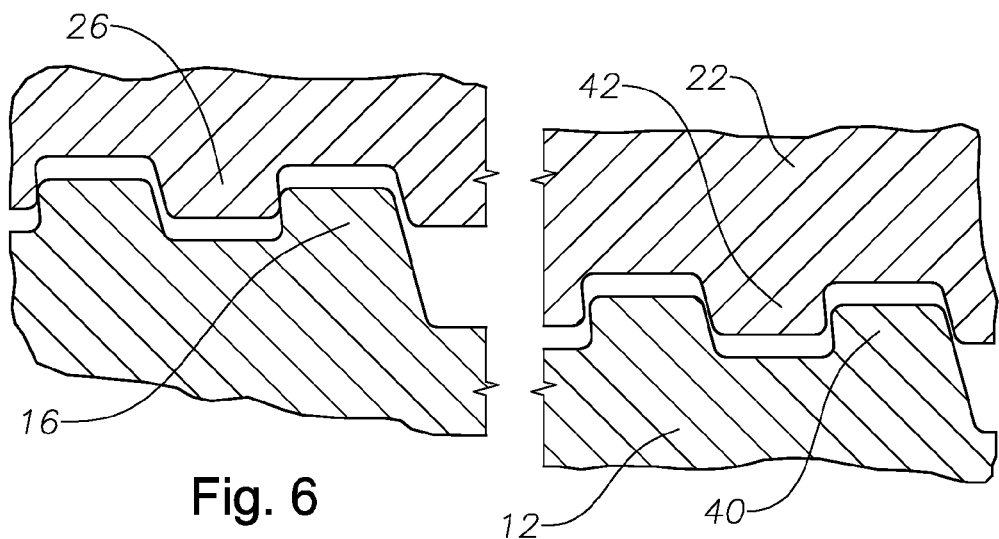
FIG. 6 illustrates in greater detail the gaps in the helical torque shoulder as shown on the right and the threads as shown on the left.
Figure 7:
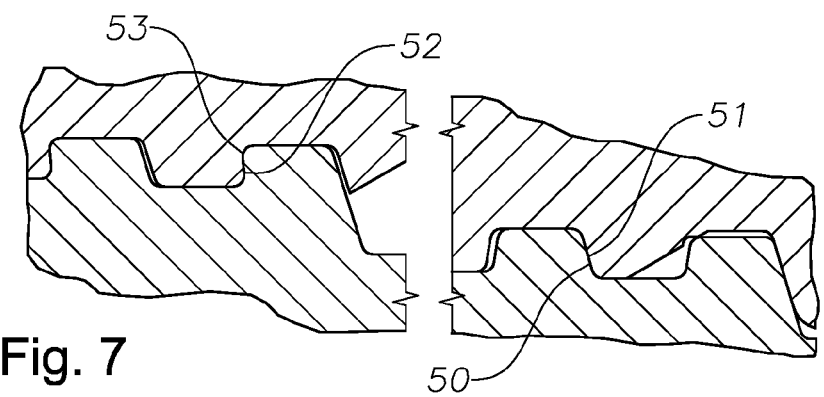
FIG. 7 illustrates in greater detail gaps for another thread form having a helical torque shoulder as shown on the right and the threads as shown on the left when the connection is fully made up.
Figure 8:
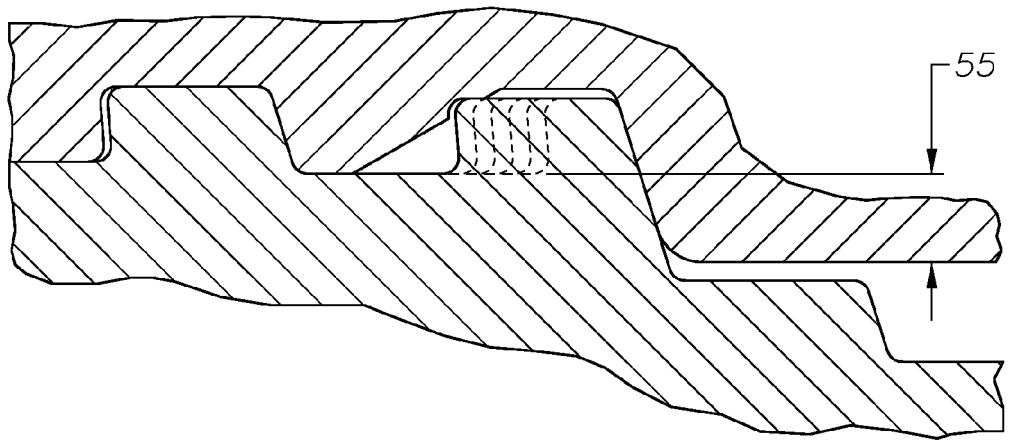
FIG. 8 illustrates the radial distance for the stop shoulder.

The present invention utilizes a helical shoulder or third thread to independently gain compression and torsional capacity of the connection by means other than a standard radial torque shoulder. For a two-step threaded connection, the helical torque shoulder is preferably mid-step and provides a third thread. Industry standard negative load flank, root to crest thread forms may be maintained for the upstream and downstream tension steps. Flexibility of thread form is allowed for the center step to attain compression capacity. In one embodiment, the same form, taper, and lead are used on all three steps, with an alternate stop shoulder incorporated. The thread interference may be set at zero with root to crest contact but no radial preload due to pitch overlap. FIG. 4 illustrates the connection 10 upon initial engagement or makeup. At this stage, it may be seen that the threads 14 and 16 on the pin member engage the threads 24 and 26 on the box member, although the helical stop shoulders are not yet engaged. In the FIG. 5 position, the box member 22 has been rotated relative to the pin member 12, so that three or more of each of the two-step threads are engaged, and one or more of the helical torque shoulder threads are engaged. FIG. 6 shows in greater detail the threaded engagement at the FIG. 5 stage, and shows that the helical torque shoulder 42 on the box member 22 may be out of engagement with the corresponding helical torque shoulder 40 on the pin member 12 while the compression flanks on the thread 16 and 26 are engaged, although there is substantial root to crest separation. The result of the makeup sequence is that the center section is a free running thread until final power tight position in which the stab flank and optional stop shoulder are engaged on the center step, with load flanks engaged on the remaining two tension steps. In the version as shown in FIG. 7, a dissimilar thread form is used for the helical torque shoulder. This thread form uses a positive load flank which aids in stabbing clearance. The center section has free running threads until near a final makeup position, in which the stab flank and the optional stop shoulder are engaged on the center step, with the load flanks engaged on the remaining two steps. Stab flanks 50, 51 are thus in engagement in FIG. 7, while the tension flanks 52, 53 are engaged on each of the two-step threads. The thread form may be the same for all three steps for commonality of tooling and the repeatability attained with using a common tool. There is no need for a negative load flank, when not engaged, on the center step. A configuration without a negative load flank may be preferred for stabbing clearance. Another improvement may use the radial distance of the stop shoulder for other uses, such as increasing machining clean up, increasing the tension areas, or reducing the outer diameter for additional clearance. In this configuration, the gap or dimension 55 shown in FIG. 8 below may not be required. FIG. 8 also illustrates that the stab flanks of the center step may be used as a stop shoulder, either alone or in conjunction with a conventional circular stop shoulder.

Figure 9:
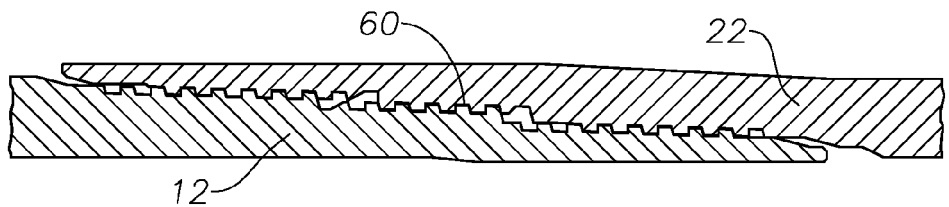
FIG. 9 illustrates an alternative connection and a different taper and thread form for the center section to aid in stabbing clearance.

While the stab flanks of the center step may be the only stop shoulder, the stab flanks preferably provide for decreased forming and manufacturing cost with less make-up position repeatability. In a preferred embodiment, the stop shoulder region below the thread root plane of the center section augments the stab flanks by acting as a compression shoulder and stop shoulder for increased make-up position repeatability. Likewise, the region shown in FIG. 8 below the root plane alternatively may be used to increase the taper, making it different for the center section to decrease stand off and delay engagement of the torque shoulder to deter galling. FIG. 9 illustrates a different taper on the center section 60 to decrease standoff and delay engagement. There is increased clearance of the threads just prior to power tight with the modified load flank and taper. This could be distinct advantage in avoiding galling. The increased taper of the center section may sacrifice most of the gap 55 mentioned above. This could be an alternate use of connection radial material.

Figure 10:
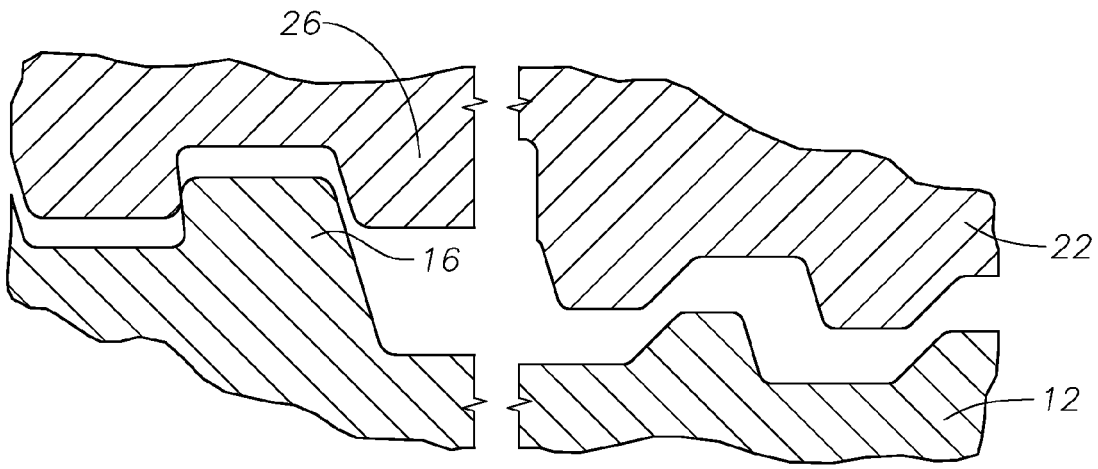
FIG. 10 illustrates an alternative designs showing a helical torque shoulder on the right and the threads on the left prior to full make up of the connection.

When investigating lead differentials between the two steps, the makeup sequence may be evaluated to avoid an interference condition between the tension steps and compression step. There are significant advantages in being able to get two different leads to makeup due to wedging action based on differences in the helix angles. In practice, one may obtain a wedge thread benefit by breaking up this feature between two separate steps. Overcoming the installation hurdles may require a combination of the design features, used in combination, wherein the load flank angle and the taper are combined with lead disparity to assure smooth assembly. FIG. 10 illustrates a connection wherein the load flank angle and taper are used in conjunction with a lead disparity to assure smooth assembly of the threads 16, 26, with a highly effective torque shoulder provided by the helical threads of the center section.

The embodiment shown in the drawings places the helical torque shoulder axially between the two step threads on the pin member and the box member. In another embodiment, each of the pin member and box member are provided with tapered threads for engagement, with an axially spaced helical torque shoulder provided on the pin member and the box member for providing the increased compression and torque capability of the oilfield tubular connection. Each helix of the helical torque shoulder may include a plurality of revolutions with compression flanks on both the pin member and the box member when the connection is assembled. The helical torque shoulder may form thread grooves which lie substantially along a tapered plane of the external tapered threads and internal tapered threads.

The direction of radial reaction force may be reversed. Negative flank forms may not be compatible with flank-to-flank contact due to galling problems under certain tolerance mismatches. There may also be a root-to-crest clearance between the threads. During compression of the tubular connection, the central force passes through the torque shoulder, which as disclosed herein is preferably a helical torque shoulder, limiting secondary bending loads by aligning the load path through the tubular with the load path through the torque shoulder and connector. This feature allows for a larger torque shoulder area, while reduced rotation between thread engagement and final makeup minimizes thread galling.

The threaded oilfield tubular connection of this invention may be of the threaded and coupled type, with a single step thread and a helical torque shoulder spaced axially from the thread, or with two axially spaced apart makeup threads and an intermediate helical torque shoulder. Alternatively, the connector may be an integral pin/expanded box connector, wherein the helical stop shoulder is provided between the first and second threads, for a total three-step threads, as disclosed herein. In still other embodiments, the connector may be an integral flush OD type or the integral upset type, wherein three or more steps (two or more makeup steps and a helical torque shoulder) are provided on the connection.

The integral upset type of connector may include a weld-on connector for larger sizes. The oilfield tubular connection as disclosed herein may serve as a reliable connection for tubing, casing, risers, or conductors. Two axially spaced makeup threads and an intermediate helical torque shoulder are preferred for integral, non-upset joints since limited material is available for metal-to-metal sealing at locations close to the OD and close to the ID of the connection, so that the pressure is initially sealed by the respective metal-to-metal seal. This embodiment thus leaves sufficient wall thickness to contain the material and the seals. An embodiment with one makeup thread and one helical torque shoulder is particularly well suited for threaded and coupled connectors, integral pin/expanded box or integral flush OD connectors welded on the ends of the tubulars. With more available material, the complexity of the connection with a second makeup thread might be unnecessary. Since a torque shoulder is helical, however, the forging or upset generally required for weld-on or upset integral joints may justify the additional second makeup step. Either an API upset on tubing may be provided, or premium upset could be provided in view of the reduced material requirements. The helical torque shoulder as disclosed herein is provided on taper, but in other embodiments the helical torque shoulder may not include a taper. The helical torque shoulder may nevertheless be provided between the tapered two-step threads on the pin and box member. The load flank angle of the makeup threads on a threaded and coupled connection or on an integral pin/expanded box connection may be negative or positive, and the stab flank angle may also be either negative or positive.

When the load flank angle on the makeup threads is positive, the makeup threads resist jump out commonly associated with flush OD and expanded box integral joints which generally have a high flexibility. In the absence of using wedge threads, positive load flanks on the makeup threads allow flank-to-flank contact of the stab flanks and assist in the desired compression and bending capability. For risers, the flank-to-flank, positive load flank may be advantageous due to the reduction of the stress amplification factor since one does not obtain a quick load/unload condition associated with opening and closing stab flank clearance. Obtaining a low stab flank clearance with a negative load flank makeup thread form may be difficult for a flank-to-flank, positive load flank thread form when the connection is in compression.

With respect to the stab flank angle for the tension or makeup threads, the stab flank angle may affect the torque required to obtain a shoulder, since a pitch interference angle controls the direction of reaction forces. Flank-to-flank threads, in the absence of a wedge, generally have more variability in the torque required to obtain a shoulder. Torque is also affected by the selection of both a stab flank and load flank angles. In many cases, the stab flank angle for the makeup threads will be positive. The negative stab flank angle for the makeup threads could act as a trapping angle, although it becomes difficult to assemble the connection unless combined with a wedging-type thread or a positive load flank thread. For the dovetail condition, a negative load flank and a stab flank may make the connection sensitive to overdoping. The stab flank angle determines the direction of reaction forces from compression, and angles closer to vertical would minimize a radial reaction force, while angles closer to being parallel to the centerline of connection would have a higher radial reaction force. Moreover, if the stab flank angle for the makeup threads is negative, this may push the connection parts together, and if positive, it could push them apart. When in close proximity to a seal, the effect on the threads could translate to performance of an energizing or de-energizing seal performance.

The preferred load flank angle for the torque shoulder may be a factor of whether engagement is solely on the stab flank of this region. If so, the load flank angle may have an affect on stabbing clearance. Mirroring what occurs in the tension or makeup steps allows commonality of tooling and more precise control of step-to-step relationships. Engaging the load flank may have a benefit if the shear and bearing safety factors of the makeup steps are marginal. If tension is allowed to translate through the helical makeup threads, the advantages and disadvantages of positive or negative angles for the makeup threads would be similar to that of the tension threads, as discussed above. When coupled with differences in lead and taper between the torque shoulder step and the tension steps, the more positive the angle, the less likely it will be to prematurely engage the torque shoulder step. A preferred stab flank angle for the torque shoulder step would also mirror the discussion above with respect to the tension step. Engagement of the stab flank angle for the torque shoulder threads is essential. Negative angles react in compression and the torque loads travel radially inward. A negative angle may be preferred when a different lead and/or taper are used compared to the makeup threads, thereby assuring stabbing clearance. Negative angles would also increase sensitivity to over-doping if coupled with negative load flanks on the tension step. A positive angle would tend to separate the pin and box when loaded. The load flank tension angle may be 90° for an integral flush OD connection, and the stab flank angle may similarly be 90° for this type of integral flush OD connection. Similarly, the load flank and the stab flank angles for the torque shoulder range may be 90° for an integral flush OD connection.

Connector threads may provide flank-to-flank engagement, or engagement of thread peaks and root crests. The engagement of the threads on the helical torque shoulder similarly may be flank-to-flank or root-to-crest engagement. Flank-to-flank engagement of the makeup threads is preferred for connections which have a high fatigue, high compression, and bending. Root-to-crest makeup threads may be more repeatable and easier to inspect. Flank-to-flank makeup threads allow for an improved thread seal, while root-to-crest engagement of these threads is compatible with a negative load flank without the use of dual leads commonly referred to as wedging threads. Accordingly, root-to-crest engagement of the makeup threads is preferred for many applications involving a flush OD or expanded box integral joint. Flank-to-flank engagement of these threads may be preferred for riser connectors, threaded and coupled connectors, or upset or weld-on integral joints and connectors where the threads are expected to provide an external seal. If the thread form is the same between the makeup thread(s) and the helical torque shoulder, a common tool may be used to cut and form the threads. The distance between the load flank of the makeup step and the stab flank of the helical torque shoulder step may then be controlled by one tool, one offset, and one turret position so that repeatability of the machine controlling this dimension would be beneficial. When these thread forms differ, one may maximize clearance by changing taper and lead and optimize the forms for their independent functions. The delta lead between the tension and torque shoulder may be constant, or may vary, and the thread formed on the two-step thread may be the same, or may differ.

The taper between the makeup threads serving as the tension steps and the torque shoulder may aid in the delay of engaging the torque shoulder, thereby minimizing galling of the torque shoulder. Higher tapers tend to stab deeper and engage later in the makeup sequence, while lower tapers have more of a "standoff." The makeup threads and/or the torque shoulder could be straight rather than tapered.

The connection of the present invention may gain a significant advantage of a negative load flank, but may lose axial stability otherwise obtained by stab flank engagement. The pipe capabilities which are maintained are compression, bending, and torsion.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope. Whereas the present invention has been described in particular relation to the drawings attached hereto, it should be understood that other and further modifications apart from those shown or suggested herein, may be made within the scope and spirit of the present invention.

What is claimed is:

1. A threaded oilfield tubular connection, comprising:
   a pin member having a first external tapered thread and a second external tapered thread axially spaced from the first external tapered thread;
   a box member having a first internal tapered thread for engagement with the first external tapered thread and a second internal tapered thread for engagement with the second external tapered thread; and
   a helical torque shoulder on each of the pin member and the box member axially spaced between the respective first and second threads, each helix of the helical torque shoulder including a plurality of revolutions with compression flanks on both the pin member and the box member of the helical torque shoulder engaged when the connection is assembled.

2. A threaded oilfield tubular connection as defined in claim 1, wherein each of the first and second threads have stab flanks engaged when the connection is assembled.

3. A threaded oilfield tubular connection as defined in claim 1, wherein the helical torque shoulder has thread grooves which lie substantially along a tapered plane spaced radially outward of a plane of the pin member external threads spaced axially between the torque shoulder and a pin nose of the pin member.

4. A threaded oilfield tubular connection as defined in claim 1, wherein the helical torque shoulder on each of the pin member and the box member is a continuous shoulder for the plurality of revolutions.

5. A threaded oilfield tubular connection as defined in claim 1, wherein the threads on the pin member and the box member and the helical shoulder or the pin member and the box member have substantially the same thread form, taper and lead.

6. A threaded oilfield tubular connection as defined in claim 1, wherein the threads on the pin member and the box member have a different lead than the helical threads on the torque shoulder.

7. A threaded oilfield tubular connection as defined in claim 1, wherein each of the tapered threads has a negative load flank.

8. A threaded oilfield tubular connection as defined in claim 1, wherein the helical torque shoulder on each of the pin member and the box member is spaced along a taper.

9. A threaded oilfield tubular connection, comprising:
a pin member having an external thread;
a box member having an internal thread for engagement with the external thread;
each of the external threads and the internal threads has stab flanks engaged when the connection is assembled; and
a helical torque shoulder on each of the pin member and the box member including a plurality of revolutions, each helix of the helical torque shoulder including a compression flank on each of the pin member and the box member of the helical shoulder when the connection is assembled.

10. A threaded oilfield tubular connection as defined in claim 9, wherein the helical torque shoulder has thread grooves which lie substantially along a plane spaced radially outward of a plane of the external threads.

11. A threaded oilfield tubular connection as defined in claim 9, wherein the helical torque shoulder on each of the pin member and the box member is a continuous shoulder for the plurality of revolutions.

12. A threaded oilfield tubular connection as defined in claim 9, wherein the threads on the pin member and the box member and the helical shoulder or the pin member and the box member have substantially the same taper and lead.

13. A threaded oilfield tubular connection as defined in claim 9, wherein the threads on the pin member and the box member have a different lead than the helical threads on the torque shoulder.

14. A threaded oilfield tubular connection as defined in claim 9, wherein each of the external and internal threads has a negative load flank.

15. A threaded oilfield tubular connection as defined in claim 9, further comprising:
another external thread on the pin member; and
another internal thread on the box member for engagement with the another external thread.

16. A method of forming threaded oilfield tubular connection, comprising:
providing a pin member having an external tapered thread; and
providing a box member having an internal tapered thread for engagement with the external tapered thread; and
providing a helical torque shoulder on each of the pin member and the box member, each helix of the helical torque shoulder including a plurality of revolutions with compression flanks on both the pin and the box member of the helical tapered shoulder engaged when the connection is assembled.

17. A method as defined in claim 16, wherein each of the external tapered thread and the internal tapered thread has engaged stab flanks when the connection is assembled.

18. A threaded oilfield tubular connection as defined in claim 16, wherein the helical torque shoulder on each of the pin member and the box member is formed as a continuous shoulder for the plurality of revolutions.

19. A method as defined in claim 16, wherein the threads on the pin member and the box member and the helical shoulder or the pin member and the box member have substantially the same thread form, taper and lead.

20. A method as defined in claim 16, wherein each of the tapered threads has a negative load flank.

21. A method as defined in claim 16, wherein the pin member helical torque shoulder threads engage the box member helical torque shoulder threads after the external tapered threads engage the internal tapered threads.

22. An oilfield tubular threaded connection, comprising:
a pin member having a first radially inner thread and a second radially outer thread axially spaced from the first radially inner thread;
a box member having a third radially inner thread and a fourth radially outer thread axially spaced from the third radially inner thread, the first inner thread mating with the third inner thread and the second outer thread mating with the fourth outer thread when the connection is assembled;
a pin member helical torque shoulder spaced between the first and second threads and formed on a plurality of helical threads; and
a box member helical torque shoulder spaced axially between the second and fourth threads and formed on a plurality of helical threads, the pin member helical threads mating with the box member helical threads when the connection is assembled to form a helical torque shoulder.

23. A connection as defined in claim 22, wherein the box member radially exterior surface is substantially flush with a radially exterior surface of a tubular extending axially from the box member.

24. A connection as defined in claim 21, wherein the stab flank of the pin member helical torque shoulder and the box member helical torque shoulder are engaged during final assembly of the connection, and wherein the load flanks of the first, second, third and fourth threads are engaged during final makeup of the connection.

25. A connection as defined in claim 21, wherein the pin member helical torque shoulder and a box member helical torque shoulder each have a negative load flank.

26. A connection as defined in claim 21, wherein the lead of the threads forming the first, second, third, and fourth threads and the lead of the threads forming the pin member helical torque shoulder and the box member helical torque shoulder are substantially the same.

27. A connection as defined in claim 21, wherein each of the first, second, third, and fourth threads provide a root-to-crest contact when the connection is assembled.

* * * * *